(12) United States Patent
Zhou et al.

(10) Patent No.: US 9,323,782 B2
(45) Date of Patent: Apr. 26, 2016

(54) MATCHING SEARCH METHOD AND SYSTEM

(71) Applicant: NOVATEK Microelectronics Corp., Hsin-Chu (TW)

(72) Inventors: Lei Zhou, Shanghai (CN); Guangzhi Liu, Shanghai (CN); Cheng-Wei Chou, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 230 days.

(21) Appl. No.: 14/054,816

(22) Filed: Oct. 15, 2013

(65) Prior Publication Data

US 2015/0023585 A1 Jan. 22, 2015

(30) Foreign Application Priority Data

Jul. 16, 2013 (CN) .......................... 2013 1 0298243

(51) Int. Cl.
*G06K 9/34* (2006.01)
*G06F 17/30* (2006.01)

(52) U.S. Cl.
CPC ............................... *G06F 17/30244* (2013.01)

(58) Field of Classification Search
None
See application file for complete search history.

(56) References Cited

U.S. PATENT DOCUMENTS

| | | | | |
|---|---|---|---|---|
| 5,657,087 A * | 8/1997 | Jeong | ................... | H04N 19/105 348/699 |
| 7,453,940 B2 * | 11/2008 | Gallant | .................. | H04N 5/145 348/E5.066 |
| 8,090,024 B2 * | 1/2012 | Watanabe | .............. | H04N 19/57 375/240.16 |
| 8,787,460 B1 * | 7/2014 | Hobbs | .................... | H04N 19/00 375/240.16 |
| 8,787,461 B2 * | 7/2014 | Kuo | ........................ | H04N 19/56 375/240.16 |
| 8,830,224 B2 * | 9/2014 | Zhao | ..................... | G06T 7/0075 345/419 |
| 2001/0014124 A1 * | 8/2001 | Nishikawa | ............ | G06T 7/2013 375/240.16 |
| 2002/0003543 A1 * | 1/2002 | Deering | ................ | G06T 15/503 345/581 |
| 2002/0005862 A1 * | 1/2002 | Deering | ................ | G09G 5/363 345/694 |
| 2003/0063673 A1 * | 4/2003 | Riemens | ................ | H04N 5/145 375/240.16 |
| 2005/0013368 A1 * | 1/2005 | Gallant | .................. | H04N 5/145 375/240.16 |
| 2006/0061658 A1 * | 3/2006 | Faulkner | ............ | H04N 5/23248 348/207.1 |

(Continued)

FOREIGN PATENT DOCUMENTS

CN 101321299 A 12/2008
CN 101635859 A 1/2010

(Continued)

OTHER PUBLICATIONS

Cheng et al. "A Comparison of Block-Matching Algorithms Mapped to Systolic-Array Implementation" IEEE Transactions on Circuits and Systems for Video Technology, vol. 7, No. 5, Oct. 1997 pp. 1-17.*

(Continued)

*Primary Examiner* — Chan Park
*Assistant Examiner* — Mia M Thomas
(74) *Attorney, Agent, or Firm* — Winston Hsu; Scott Margo

(57) ABSTRACT

A matching search method is utilized for performing a matching search from a first image block to a second image block in a stereo matching system. The matching search method includes obtaining a global offset of the first image block corresponding to the second image block according to an offset relationship between a first image data of the first image block and a second image data of the second image block; and performing the matching search from the first image block to the second image block according to the global offset and a searching range.

10 Claims, 4 Drawing Sheets

(56) References Cited

U.S. PATENT DOCUMENTS

| | | | |
|---|---|---|---|
| 2009/0275850 A1* | 11/2009 | Mehendale | A61B 5/04525 600/523 |
| 2010/0111417 A1* | 5/2010 | Ward | G06T 7/0071 382/173 |
| 2010/0166323 A1* | 7/2010 | Zhao | G06T 7/0028 382/218 |
| 2012/0201475 A1* | 8/2012 | Carmel | H04N 19/172 382/238 |
| 2013/0033582 A1 | 2/2013 | Sun | |
| 2013/0113881 A1 | 5/2013 | Barnum | |
| 2013/0271427 A1* | 10/2013 | Benbasat | G06F 3/0418 345/175 |
| 2014/0204181 A1* | 7/2014 | Delattre | G06T 7/002 348/47 |
| 2015/0215626 A1* | 7/2015 | Kim | H04N 19/597 375/240.02 |

FOREIGN PATENT DOCUMENTS

| | | |
|---|---|---|
| CN | 102387387 A | 3/2012 |
| TW | 201227602 A1 | 7/2012 |
| TW | 201327474 | 7/2013 |

OTHER PUBLICATIONS

Weng et al. "Camera Calibration with Distortion Models and Accuracy Evaluation" IEEE Transactions on Pattern Anaylsis and Machine Intelligence, vol. 14, No. 10, Oct. 1992 pp. 1-16.*

* cited by examiner

MATCHING SEARCH METHOD AND SYSTEM

BACKGROUND OF THE INVENTION

1. Field of the Invention

The present invention relates to a matching search method and a matching search system, and more particularly, to a matching search method and a matching search system capable of dynamically determining a search position and a search range according to image data.

2. Description of the Prior Art

With continuously progressing image technologies, sizes and functionalities of display devices are increasingly diverse. In order to meet requirements of the different consumers, manufacturers of the display devices try to provide new products with better outputting performance and resolution. One of the most interesting products is a display device with three-dimensional display functionality. General three-dimensional display technologies include polarized, interlaced or anaglyph display methods. These display methods utilize special optical structures to project images with different views corresponding to depth information on human left and right eyes. Thus, the human left and right eyes may respectively capture the images with different views to be synthesized by the human brain, and the human may sense a three-dimensional image.

When two-dimensional images without the depth information are displayed by the display device having the three-dimensional display functionality, since the source images for displaying lack the depth information, the display device may not generate multi-views images corresponding to the depth information to be projected on the human left and right eyes. Under such a condition, the display device is required to analyze the two-dimensional images to obtain the depth information, so as to display the multi-views images. In the prior art, at least two images with different views are required to be obtained first by utilizing multiples image capture devices located in different locations, and the depth information may be analyzed from the at least two images with different views. A process for analyzing two images with different views to obtain the depth information is called stereo matching. In the stereo matching, a matching search is performed first between the two images with different views, and matching objects (or characteristics, pixels, etc.) are searched to obtain positional differences of the matching objects in the two images with different views. The positional differences are disparity information (or can be called a disparity map) of the two images, and the depth information of the matching objects may be calculated by the disparity information.

However, since landscapes of the two images with different views are not entirely the same, in the prior art, the matching search is performed within the entire data range of the two images to obtain an accurate matching search result. Under such a condition, more computing cost for the matching search is required, such as more computing time, more hardware cost, or more power consumption, etc. When the resolution of the image is higher, such as a high-definition image, the data range is wider and the computing cost of the matching search is respectively increased. Therefore, how to determine the search range of the matching search for saving the computing cost and not affecting accuracy of the matching search result has become a most important topic in the stereo matching technologies.

SUMMARY OF THE INVENTION

It is therefore an objective of the present invention to provide a matching search method and a matching search system capable of dynamically determining a search position and a search range of a matching search according to image data for saving computing cost of the matching search and not affecting accuracy of a matching search result.

The present invention discloses a matching search method for performing a matching search from a first image block to a second image block in a stereo matching system. The matching search method comprises obtaining a global offset of the first image block corresponding to the second image block according to an offset relationship between a first image data of the first image block and a second image data of the second image block; and performing the matching search from the first image block to the second image block according to the global offset and a searching range.

The present invention further discloses a matching search system for performing a matching search from a first image block to a second image block. The matching search system comprises a calculating module for obtaining a global offset of the first image block corresponding to the second image block according to an offset relationship between a first image data of the first image block and a second image data of the second image block; and a matching module for performing the matching search from the first image block to the second image block according to the global offset and a searching range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
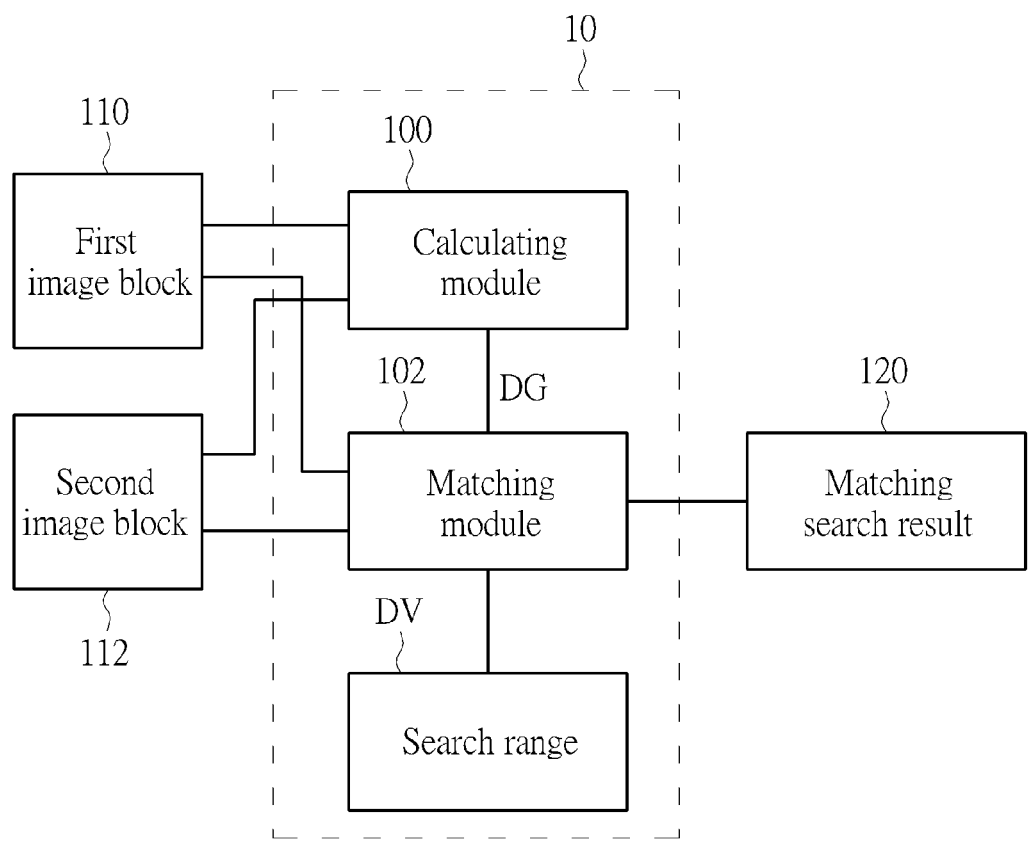
FIG. 1 is a schematic diagram of a matching search system according to an embodiment of the present invention.

Please refer to FIG. 1, which is a schematic diagram of a matching search system 10 according to an embodiment of the present invention. As shown in FIG. 1, the matching search system 10 includes a calculating module 100, a matching module 102, and a search range DV. The matching search system 10 may perform a matching search from a first image block 110 to a second image block 112 to obtain a matching search result 120 of the first image block 110 corresponding to the second image block 112.

In general, two images with different views corresponding to a captured object may be obtained by two image capture devices located at a left side and a right side of the captured object, and the two images are called a left-view image and a right-view image. When the left-view image and the right-view image are performed a stereo matching, a matching search between the left-view image and the right-view image is performed first and then a disparity is calculated according to a result of the matching search to obtain a stereo matching result. For computing cost and complexity consideration, the left-view image and the right-view image are partitioned into small image blocks, and the stereo matching is performed on the small image blocks to obtain stereo matching results of the small image blocks. Finally, the stereo matching results of the small image blocks may be integrated into overall stereo matching results of the left-view image and the right-view image.

In FIG. 1, the first image block 110 and the second image block 112 may be regarded as the small image blocks of the left-view image and the right-view image, such as a scan line of the left-view image and a scan line of the right-view image, or a small region of the left-view image and a small region of the right-view image. The small regions of the left-view image and the right-view image may be square or rectangular regions composed of pixels. When the first image block 110 and the second image block 112 are two scan lines of the two images with different views, block sizes of the first image block 110 and the second image block 112 (i.e. a pixel number of the scan line) are not fixed, which may be adjusted according to system requirements. Thereby, the matching search system 10 may perform the matching search from the first image block 100 to the second image block 112 at a determined search position within the predefined search range DV according to image data of the first image block 110 and the second image block 112 to obtain the matching search result 120 of the first image block 100 corresponding to the second image block 112.

In detail, the calculating module 100 and the matching module 102 respectively may be implemented by an application specific integrated circuit (ASIC), or may be integrated in a same ASIC. In addition, the calculating module 100 or the matching module 102 may also be implemented by a processor and a storage device for storing a program code to indicate to the processor to perform calculating or matching search. The storage device is a read-only memory (ROM), a random-access memory (RAM), a CD-ROM, a magnetic tape, a floppy disk, or an optical data storage device, etc, and is not limited herein. The search range DV is a predefined value of the matching search system 10 and may be stored in a flash ROM, ROM, or RAM.

First, the calculating module 100 obtains a global offset DG of the first image block 110 corresponding to the second image block 112 according to an offset relationship between a first image data of the first image block 110 and a second image data of the second image block 112. Specifically, the calculating module 100 shifts the first image data respectively by at least one offset value to generate at least one offset image data. For example, the calculating module 100 shifts the first image data respectively by 1-3 pixels to generate offset image data with 1 pixel offset, offset image data with 2 pixels offset, and offset image data with 3 pixels offset.

Next, the calculating module 100 compares the at least one offset image data with the second image data to obtain an offset image data most similar to the second image data from the at least one offset image data, and the offset image data most similar to the second image data is labeled as a similar image data. In detail, the calculating module 100 computes similarity between the at least one image data and the second image data to generate at least one similarity value, and the calculating module 100 obtains the similar image data by comparing the at least one similarity value. The at least one similarity value between the at least one image data and the second image data may be calculated according to general algorithms, such as a sum of absolute differences, or a sum of squared differences, etc, which are not limited.

Finally, the calculating module 100 may obtain an offset value corresponding to the similar image data from the at least one offset value as the global offset DG. The global offset DG represents the offset relationship between the first image data and the second image data, that is, when the first image data is shifted by the global offset DG, the shifted first image data is most similar to the second image data.

For example, when the first image block 110 and the second image block 112 are two scan lines, the first image data and the second image data are pixel values of the scan lines. Under such a condition, the calculating module 100 may shift the first image data respectively by 1-3 pixels to generate offset image data with 1 pixel offset, offset image data with 2 pixels offset, and offset image data with 3 pixels offset. Then, the calculating module 100 computes the three similarity values between the offset image data with 1-3 pixels offset and the second image data, wherein the three similarity values may be calculated according to the algorithm of a sum of absolute differences, that is, the three similarity values are the sums of absolute pixel value differences between the offset image data with 1-3 pixels offset and the second image data. Finally, the calculating module 100 determines a minimum of the three similarity values as a minimum similarity value to obtain the offset image data corresponding to the minimum similarity value. For example, when the offset image data corresponding to the minimum similarity value is the offset image data with 2 pixels, the global offset is 2.

When the global offset DG is obtained by the calculating module 100, the matching module 100 may perform the matching search from the first image block 110 to the second image block 112 according to the global offset DG and the searching range DV. Specifically, the matching module 104 shifts the first image data of the first image block 110 by the global offset DG to generate a global offset data. Next, the matching module 104 utilizes the global offset data and the second image data of the second image block to perform the matching search from the first image block 110 to the second image block 112 within the searching range DV to obtain the matching search result 120. Noticeably, since the searching range DV is predefined in the matching search system 10, and the matching module 102 utilizes the global offset data and the second image data to perform the matching search, the predefined searching range DV of the matching search system 10 may be configured to be smaller than all data range of the first image block 110 or the second image block 112 (i.e. block size of the first image block 110 or the second image block 112).

In short, according to the offset relationship between the first image data of the first image block 110 and the second image data of the second image block 112, the matching search system 10 may obtain that when the first image data of the first image block 110 is shifted by the global offset DG, the shifted first image data of the first image block 110 is most similar to the second image data of the second image block 112. Thereby, the matching search system 10 does not require performing matching search within the all data range of the first image block 110 or the second image block 112. The matching search system 10 may shift the first image data of the first image block 110 by the global offset DG to be most similar to the second image data of the second image block 112, and then the matching search system 10 performs the matching search from the first image block 110 to the second image block 112 within the smaller search range DV. As a result, the computing cost required for the matching search may be saved, and the accuracy of the matching search result may not be affected. In addition, every time when the matching search system 10 performs the matching search from the first image block 110 to the second image block 112, the matching search system 10 determines the offset relationship between the image data of the two image blocks to obtain the global offset DG and performs the matching search from the first image block 110 to the second image block 112 within the search range DV. Thus, the matching search system 10 may dynamically determine a search position and a search range according to the image data.

Figure 2:
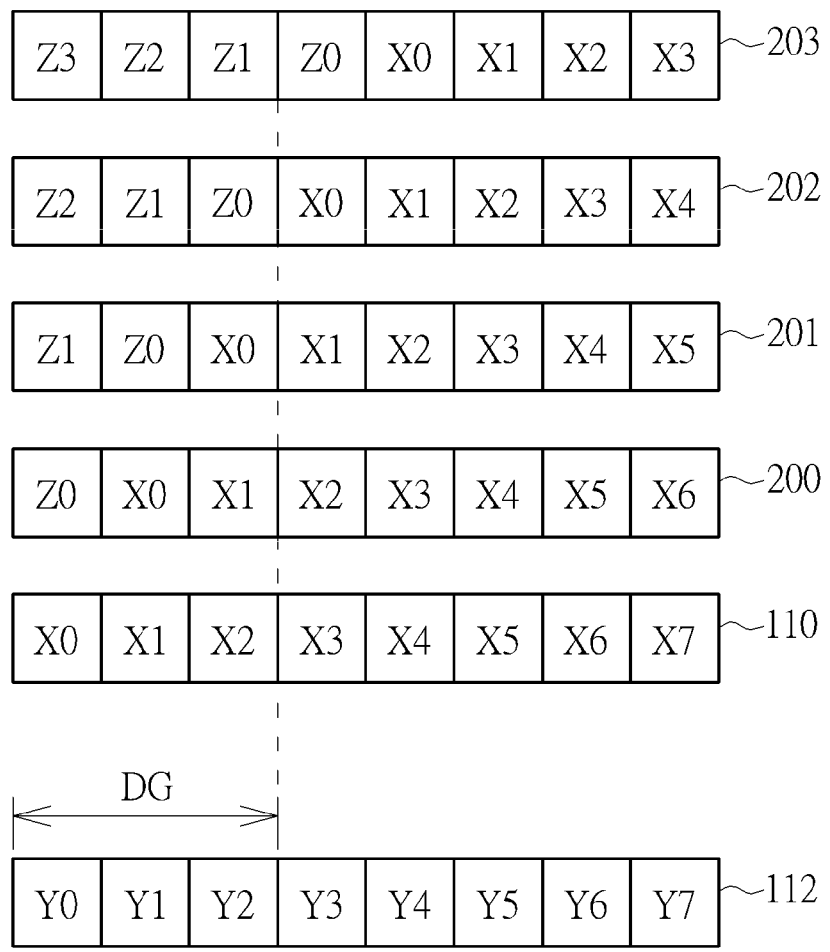
FIG. 2 is a schematic diagram of obtaining a global offset by a calculating module according to an embodiment of the present invention.

The implementing method of the calculating module 100 determining the offset relationship between the image data of the first image block 110 and the second image block 112 to obtain the global offset DG is not limited to specific processes. For example, please refer to FIG. 2, which is a schematic diagram of obtaining the global offset DG by the calculating module 100 according to an embodiment of the present invention. As shown in FIG. 2, the first image block 110 includes pixels X0-X7, and the second image block 112 includes pixels Y0-Y7. The calculating module 100 respectively shifts the pixels X0-X7 of the first image block 110 to the right by 1-4 pixels to form image block 200-203. In the embodiment, new pixels generated due to the shifting are represented by pixels Z0-Z3 and the pixels Z0-Z3 may be further configured as specific values according to actual requirements, such as value 0, value 255, or the pixel X0, etc, which are not limited. After the first image block 110 is shifted by 1-4 pixels, the image blocks 200-203 are formed, wherein the image block 200 includes the pixels Z0 and X0-X6, the image block 201 includes the pixels Z1-Z0 and X0-X5, the image block 202 includes the pixels Z2-Z0 and X0-X4, and the image block 203 includes the pixels Z3-Z0 and X0-X3.

Next the calculating module 100 respectively calculates the similarity values between the eight pixels of the image blocks 200-203 and the pixels Y0-Y7 of the second image block 112. For example, the calculating module 100 may calculate differences between the pixels Z3-Z0 and X0-X3 of the image block 203 and the pixels Y0-Y7 of the second image block 112, and then the calculating module 100 computes absolute values of the differences to obtain the eight absolute difference values. Finally, the similarity value between the image block 203 and the second image block 112 may be obtained by summing the eight absolute difference values. According to the above calculating method, the similarity values between the image blocks 200-203 and the second image block 112 may all be obtained. Then, the calculating module 100 compares the similarity values of the image blocks 200-203 to determine a minimum similarity value, and the similar image data most similar to the pixels Y0-Y7 of the second image block 112 may be obtained according to the minimum similarity value. For example, if the similar image data is the pixels Z2-Z0 and X0-X4 of the image block 202, since the image block 202 is shifted from the first image block 110 by 3 pixels, the calculating module 100 may obtain the global offset to be 3.

Figure 3:
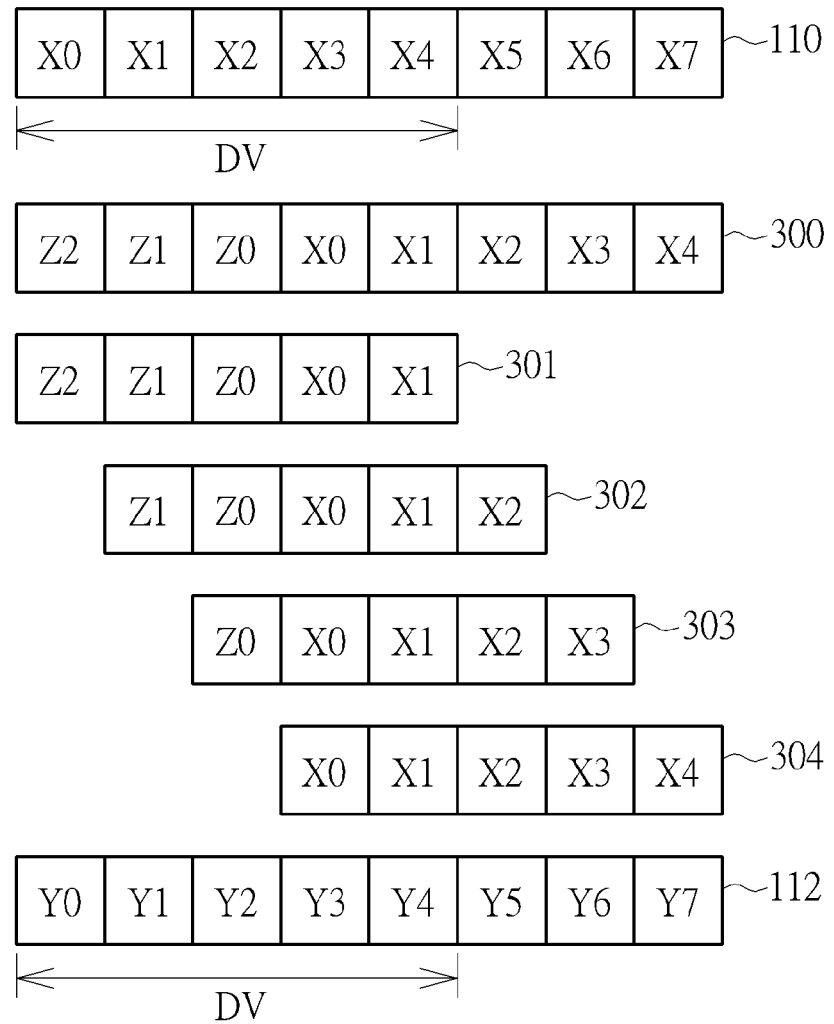
FIG. 3 is a schematic diagram of performing a matching search from a first image block to a second image block by a matching module according to an embodiment of the present invention.

Furthermore, please refer to FIG. 3, which is a schematic diagram of performing the matching search from the first image block 110 to the second image block 112 by the matching module 102 according to an embodiment of the present invention. As shown in FIG. 3, the matching module 104 may shift the pixels X0-X7 of the first image block 110 according to the global offset DG generated by the calculating module to obtain the image block 300. Since the global offset DG is 3, the image block 300 is formed by the pixels Z2-Z0 and X0-X4. Similarly, new pixels generated due to the shifting are represented by pixels Z0-Z2 and the pixels Z0-Z2 may be further configured as the specific values according to actual requirements, which are not limited. Finally, the matching module 104 utilizes the pixels Z2-Z0 and X0-X4 of the image block 300 and the pixels Y0-Y7 of the second image block 112 to perform the matching search from the first image block 110 to the second image block 112 within the search range DV. In the embodiment, the search range is configured as 5, and the matching module 104 may sequentially utilize search blocks 301-304 with 5 pixels to perform the matching search to the corresponding pixels of the second image block 112 pixel by pixel to obtain the matching search result 120 from the first image block 110 to the second image block 112.

As a result, the matching search system 10 does not require performing the matching search pixel by pixel within the entire pixel range of the first image block 110 (i.e. 8 pixels). The matching search system 10 first obtains the global offset DG by the calculating module 100 according to the offset relationship between the pixels X0-X7 of the first image block 110 and the pixels Y0-Y7 of the second image block 112, and then the matching search system 10 shifts the pixels X0-X7 of the first image block 110 to the global offset data for performing the matching search with the pixels Y0-Y7 of the second image block 112. Thereby, the matching search system 10 may configure the search range DV to be a smaller search range to perform the matching search for saving the computing cost of the matching search. In addition, since the global offset data is most similar to the pixels Y0-Y7 of the second image block 112, the matching object may also be correctly found within the search range DV with the smaller search range and the accuracy of the matching result may not be affected.

Figure 4:
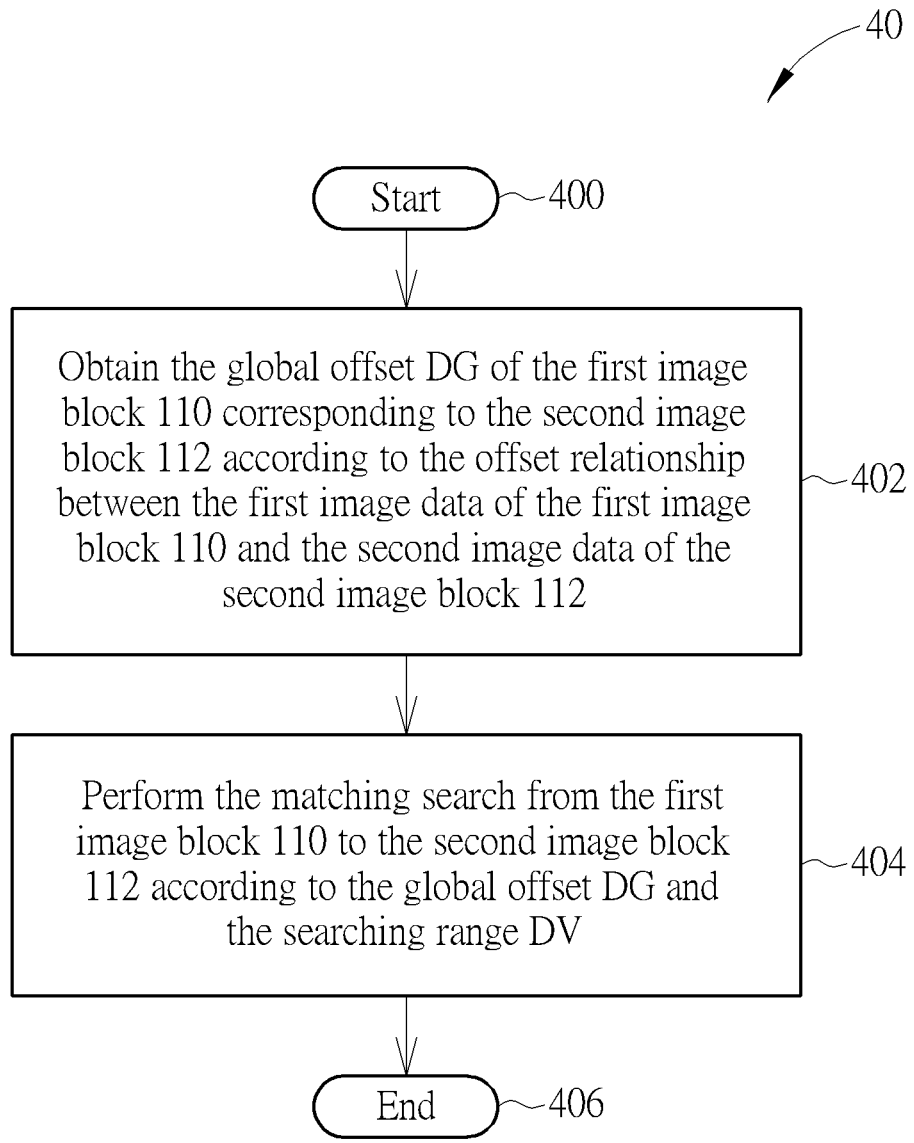
FIG. 4 is a schematic diagram of a matching search process according to an embodiment of the present invention.

The method for performing the matching search from the first image block 110 to the second image block 112 to obtain the matching search result 120 may be further summarized as a matching search process 40. As shown in FIG. 4, the matching search process 40 includes the following steps:

Step 400: start.

Step 402: obtain the global offset DG of the first image block 110 corresponding to the second image block 112 according to the offset relationship between the first image data of the first image block 110 and the second image data of the second image block 112.

Step 404: perform the matching search from the first image block 110 to the second image block 112 according to the global off set DG and the searching range DV.

Step 406: end.

The detail operations of each step in the matching search process 40 may be referred from the foregoing description of the embodiments, and will not be narrated hereinafter. Furthermore, the matching search process 40 in the embodiment is utilized for performing the matching search from the first image block 110 to the second image block 112. The matching search from the second image block 112 to the first image block 110 may also be performed according to the matching search process 40 to obtain the matching search result of the second image block 112.

Specifically, in the present invention, the global offset DG is obtained according to the offset relationship between the image data of the two images for performing the matching search, and since the image data of one image is shifted by the global offset DG to be most similar to the image data of another image, the matching search between the two images may be performed within a smaller search range and the accurate matching search result may also be obtained. Those skilled in the art can make modifications or alterations accordingly. In the embodiment, the search range DV is pre-defined in the matching search system 10. However, the search range DV may also be modified according to the system requirement. For example, the search range DV may also be adjusted according to the similarity between the image data of the two images. When the similarity between the image data of the two images is greater, the object moving between the two images is smaller and the search range DV may be decreased. When the similarity between the image data of the two images is smaller, the object moving between the two images is larger and the search range DV may be increased.

Moreover, in the embodiment, the global offset DG is obtained by calculating the similarity value between the image data of the two image blocks, and the similarity value is the sum of the absolute pixel value differences between the image data of the two image blocks. In other embodiments, the similarity value between the image data of the two image blocks may also be calculated by the sum of the squared pixel value differences, or the sum of differences of values in frequency domain, which are transformed from the pixel values of the two image blocks.

In summary, in the prior art, the matching search is performed within the entire data range of the two images with different views, and a more computing cost is required. In comparison, the present invention may dynamically determine the search position and the search range of the matching search according to the image data for saving the computing cost of the matching search and not affecting the accuracy of the matching search result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A matching search method for a stereo matching system, the matching search method comprising:
   generating a plurality of offset image blocks by shifting a first image block by a plurality of offset values, wherein the first image block is a part of a first image captured at a right view or a left view to an object and each of the offset image blocks comprises a partial of the first image block and predetermined image data;
   comparing each of the offset image blocks to a second image block, which is a part of a second image captured at the other side of view to the object with respect to the first image, so as to determine, from the offset image blocks, a first offset image block which is the most similar to the second image block;
   obtaining a global offset of the first image block relative to the second image block, wherein the global offset is the offset of the most similar first offset image block relative to the second image block;
   performing a matching search for the first offset image block relative to the second image block to generate a matching search result; and
   obtaining disparity information according to the matching search result and the global offset.

2. The matching search method of claim 1, wherein the first image block is a scan line of the first image and the second image block is a scan line of the second image.

3. The matching search method of claim 1, wherein a step of comparing each of the offset image blocks to the second image block so as to determine the first offset image block which is the most similar to the second image block comprises:
   computing similarity between each of the offset image blocks and the second image data to generate similarity values; and
   obtaining the first offset image block most similar to the second image data from the offset image blocks according to the similarity values.

4. The matching search method of claim 3, wherein each similarity value is a sum of absolute differences each between a pixel data of one of the offset image blocks and a corresponding pixel data of the second image block.

5. The matching search method of claim 3, wherein a step of obtaining the first offset image block most similar to the second image data from the offset image blocks according to the similarity values comprises:
   determining the minimum similarity value among the similarity values; and
   obtaining the first offset image block corresponding to the minimum similarity value of the similarity values.

6. A computer system for performing stereo matching, the computer system comprising:
   a processing unit; and
   a storage device, storing a programming code, for performing a matching search method, executed by the processing unit, the matching search method comprising:
      generating a plurality of offset image blocks by shifting a first image block by a plurality of offset values, wherein the first image block is a part of a first image captured at a right view or a left view to an object and each of the offset image blocks comprises a partial of the first image block and predetermined image data;
      comparing each of the offset image blocks to a second image block, which is a part of a second image captured at the other side of view to the object with respect to the first image, so as to determine, from the offset image blocks, a first offset image block which is the most similar to the second image block;
      obtaining a global offset of the first image block relative to the second image block, wherein the global offset is the offset of the most similar first offset image block relative to the second image block;
      performing a matching search for the first offset image block relative to the second image block to generate a matching search result; and
      obtaining disparity information according to the matching search result and the global offset.

7. The computer system of claim 6, wherein the first image block is a scan line of the first image and the second image block is a scan line of the second image.

8. The computer system of claim 6, wherein a step of comparing each of the offset image blocks to the second image block so as to determine the first offset image block which is the most similar to the second image block of the matching search method comprises:
   computing similarity between each of the offset image blocks and the second image data to generate similarity values; and
   obtaining the first offset image block most similar to the second image data from the offset image blocks according to the similarity values.

9. The computer system of claim 8, wherein each similarity value is a sum of absolute differences each between a pixel data of one of the offset image blocks and a corresponding pixel data of the second image block.

10. The computer system of claim 8, wherein a step of obtaining the first offset image block most similar to the second image data from the offset image blocks according to the similarity values of the matching search method comprises:
    determining the minimum similarity value among the similarity values; and
    obtaining the first offset image block corresponding to the minimum similarity value of the similarity values.

* * * * *